(12) United States Patent
Morello et al.

(10) Patent No.: US 9,511,627 B2
(45) Date of Patent: Dec. 6, 2016

(54) HUB-BEARING UNIT WITH A SEALING DEVICE

(71) Applicants: Fausto Morello, Sommariva del Bosco (IT); Andrea Serafini, Pinerolo (IT)

(72) Inventors: Fausto Morello, Sommariva del Bosco (IT); Andrea Serafini, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/884,804

(22) Filed: Oct. 16, 2015

(65) Prior Publication Data

US 2016/0114624 A1 Apr. 28, 2016

(30) Foreign Application Priority Data

Oct. 23, 2014 (IT) .............................. TO2014A0861

(51) Int. Cl.
| F16C 33/78 | (2006.01) |
| F16C 33/80 | (2006.01) |
| B60B 27/00 | (2006.01) |
| F16C 19/18 | (2006.01) |

(52) U.S. Cl.
CPC ....... *B60B 27/0073* (2013.01); *B60B 27/0005* (2013.01); *F16C 33/7823* (2013.01); *F16C 33/7826* (2013.01); *F16C 33/7886* (2013.01); *F16C 33/80* (2013.01); *F16C 33/805* (2013.01); *F16C 19/186* (2013.01); *F16C 2226/12* (2013.01); *F16C 2326/02* (2013.01)

(58) Field of Classification Search
CPC ....... F16C 19/04; F16C 19/18; F16C 33/7816; F16C 33/7823; F16C 33/7886; F16C 33/80; F16F 33/7866
USPC ........ 384/477, 478, 484, 486, 480, 544, 589
See application file for complete search history.

(56) References Cited

U.S. PATENT DOCUMENTS

| 2007/0031079 A1* | 2/2007 | Komori ................... B60B 27/00 384/589 |
| 2007/0076994 A1* | 4/2007 | Norimatsu .............. B60B 27/00 384/486 |
| 2010/0259014 A1* | 10/2010 | Nakagawa ........... F16J 15/3264 277/559 |

(Continued)

FOREIGN PATENT DOCUMENTS

| DE | 102009052311 | * | 5/2011 | ......... B60B 27/0005 |
| DE | 102010034385 A1 | | 2/2012 | |

(Continued)

*Primary Examiner* — Marcus Charles
(74) *Attorney, Agent, or Firm* — Bryan Peckjian; SKF USA Inc. Patent Dept.

(57) ABSTRACT

A hub-bearing unit for rotatably is provided with a stationary radially outer ring, a radially inner ring, an annular gasket, and a second metal insert. The radially inner ring includes a flange for mounting a wheel and a sealing device having a first metal insert, annular shaped, steadily fixed at an end portion of the outer ring facing the flange. The annular gasket includes a plurality of elastomeric sealing lips and steadily fixed to the metal insert. The second metal insert is steadily fixed on an axial cylindrical surface of the inner ring. The gasket presents a first axial contacting lip. The first axial contacting lip slidingly contacts a substantially frustoconical portion of the metal insert.

7 Claims, 2 Drawing Sheets

(56) References Cited

U.S. PATENT DOCUMENTS

| | | | | |
|---|---|---|---|---|
| 2012/0177315 A1* | 7/2012 | Matsuki | ............ | B60B 27/0005 |
| | | | | 384/478 |
| 2013/0127119 A1* | 5/2013 | Haepp | ................ | F16C 33/7863 |
| | | | | 277/351 |
| 2015/0003766 A1* | 1/2015 | Duch | ...................... | F16C 19/04 |
| | | | | 384/480 |

FOREIGN PATENT DOCUMENTS

| | | | | | |
|---|---|---|---|---|---|
| DE | 102013218635 | * | 3/2015 | ............ | F16C 33/805 |
| EP | 0286151 | A2 | 10/1988 | | |
| EP | 1128078 | A2 | 8/2001 | | |
| EP | 1803948 | A1 | 7/2007 | | |
| EP | 1902863 | A2 * | 3/2008 | ............ | F16C 19/386 |
| JP | 2003056577 | A * | 2/2003 | | |
| JP | 2005291485 | A * | 10/2005 | | |
| JP | 2008274994 | A | 11/2008 | | |
| JP | 2008298106 | A * | 12/2008 | | |
| JP | 2010001969 | A * | 1/2010 | | |
| JP | 2010032013 | A * | 2/2010 | | |
| JP | 2011117529 | A | 6/2011 | | |
| WO | WO 2008149512 | A1 * | 12/2008 | ......... | B60B 27/0005 |

* cited by examiner

HUB-BEARING UNIT WITH A SEALING DEVICE

CROSS REFERENCE TO RELATED APPLICATION

This is a Non-Provisional patent application, filed under the Paris Convention, claiming the benefit of Italy (IT) Patent Application Number TO2014A000861, filed on 23 Oct. 2014, which is incorporated herein by reference in its entirety.

TECHNICAL FIELD

The present invention relates to a hub-bearing unit comprising a hub provided with a sealing device. More particularly, the unit has an axis of rotation and serves to rotatably mount a wheel of a vehicle to a suspension of the vehicle, and includes a radially outer ring, stationary; a radially inner ring, which is rotatable about the axis of rotation and has a flange which extends radially outwardly for mounting a wheel; a sealing device, mounted on the outer ring and having a plurality of elastomeric sealing lips which extend towards the inner ring.

BACKGROUND ART

Hub-bearing units of the flanged type for application to driving wheels of a motor vehicle are already known to the state of the art. Some examples are described in EP 0286151 A2, EP 1128078 A2, EP 1803948 A1. In general, the automobile industry must meet a growing demand in terms of reduction of fuel consumption and exhaust emissions.

SUMMARY OF THE PRESENT INVENTION

Aim of the present invention is to provide a hub-bearing unit provided with a sealing device, which, on the one hand, ensures a high level of protection, and, simultaneously, lead to a reduction of the friction torque caused by the sealing device when the rings of the bearing are in relative rotation. Moreover, other aim is to simplify processes and thus reduce the cost of the manufacturing process of the whole unit.

According to the present invention a hub-bearing unit is disclosed, presenting the characteristics including: a hub-bearing unit for rotatably mounting a wheel to a vehicle, the unit having an axis of rotation and comprising:
  a radially outer ring, stationary;
  a radially inner ring, which is rotatable about the axis of rotation and provides a flange extending in a radially outer direction for mounting a wheel;
  a plurality of rolling bodies interposed between the outer and inner rings; and
  a sealing device comprising a first metal insert, having an annular shape, steadily fixed at an end portion of the outer ring facing the flange, an annular gasket, having a plurality of elastomeric sealing lips and steadily fixed to the metal insert, and a second metal insert, steadily fixed on an axial cylindrical surface of the inner ring,
  wherein the gasket presents a first axial contacting lip, which slidingly contacts a substantially frustoconical portion of the metal insert,
  wherein the axial positioning of the metal insert is ensured by the contact of a substantially radial portion against a radial surface of the flange,
  wherein the flange forms an annular protrusion, which projects in an axially internal direction and presents a radially internal surface, the radially internal surface being one of cylindrical or frustoconical shaped, exposed towards the rotation axis,
  wherein the axial cylindrical surface of the inner ring is adjacent to a racing race, is exposed towards a radially external direction and is radiused to a toroidal surface portion, located at the flange base from the axially internal side and the toroidal surface portion is radiused to a radial surface portion,
  wherein the radially internal surface is radiused to the radial surface portion.

In a second characteristic of the present invention, the second metal insert further comprises a cylindrical portion,
  wherein the cylindrical portion is tight fit with radial interference around the cylindrical surface of the inner ring,
  wherein the substantially frustoconical portion extends in an axially and radially external direction from an end portion of the cylindrical portion,
  wherein the substantially radial portion, is disc shaped and extends in a radially external direction from an end portion of the frustoconical portion.

In another characteristic of the present invention, at least one of the elastomeric sealing lips of the sealing device is an axial non-contacting lip,
  wherein the axial non-contacting lip axially extends towards the flange and has a free end portion,
  wherein the free end portion performs a labyrinth seal, without contact, with the radially internal surface of the annular protrusion.

In yet another characteristic of the present invention, the free end portion of the non-contacting axial lip has one of a cylindrical or a frustoconical surface,
  wherein the one of the cylindrical or the frustoconical surface axially extends and is coaxially exposed inside the radially inner surface of the protrusion, so as to form with the surface, one of a cylindrical gap or a frustoconical gap, thus obtaining a labyrinth seal.

In yet another characteristic of the present invention, the annular protrusion projects in an axially internal direction beyond the one of the cylindrical surface or the frustoconical surface of the non-contacting lip.

In yet another characteristic of the present invention, the free end portion of the axial non-contacting lip has an axially external surface,
  wherein the axially external surface is exposed to the substantially radial portion of the second metal insert.

In yet another characteristic of the present invention, the flange presents a radial surface portion,
  wherein the radial surface portion is formed on an axially internal side of the flange, in a radially external position with respect to the annular protrusion position and in that the annular protrusion is radiused to the radial surface by a toroidal surface.

BRIEF DESCRIPTION OF THE DRAWINGS

The present invention will be now described by reference to the enclosed figures, which show some non-limitative embodiments, in which.

DETAILED DESCRIPTION OF THE PRESENT INVENTION

Figure 1:
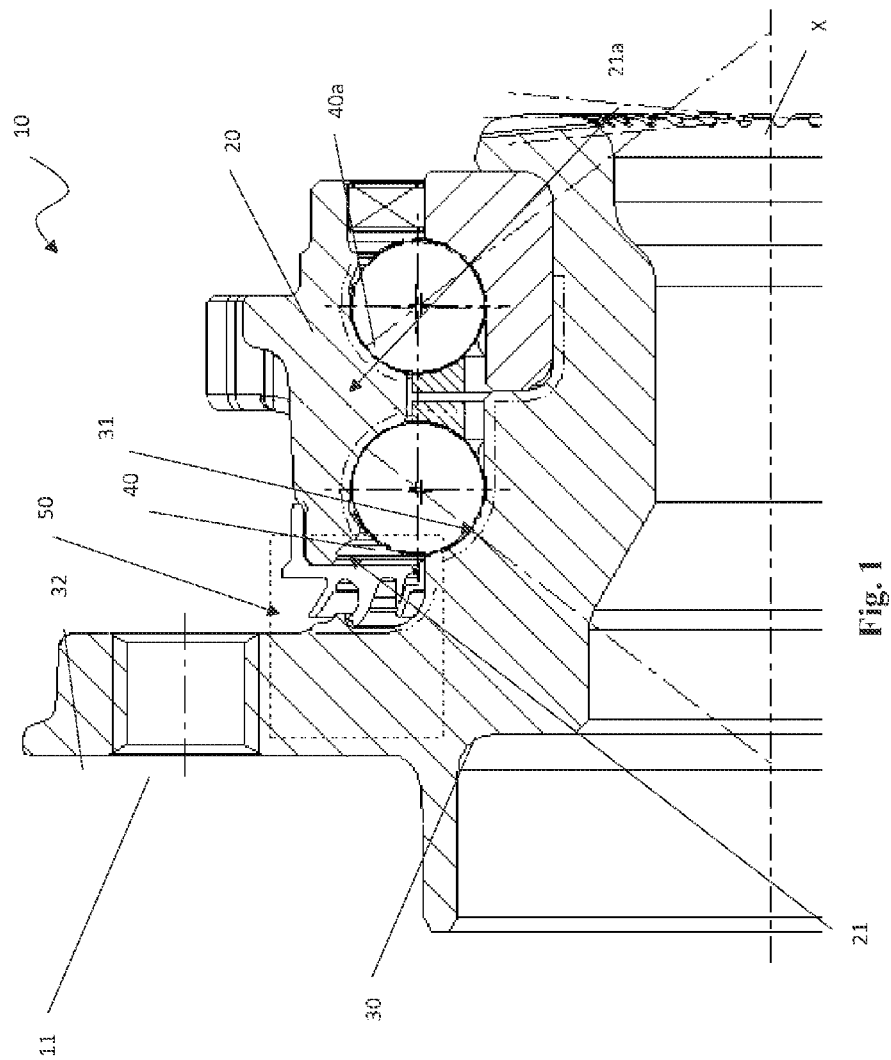
FIG. 1 is an axisymmetric section of the hub-bearing unit according to a preferred embodiment of the present invention.
Figure 2:
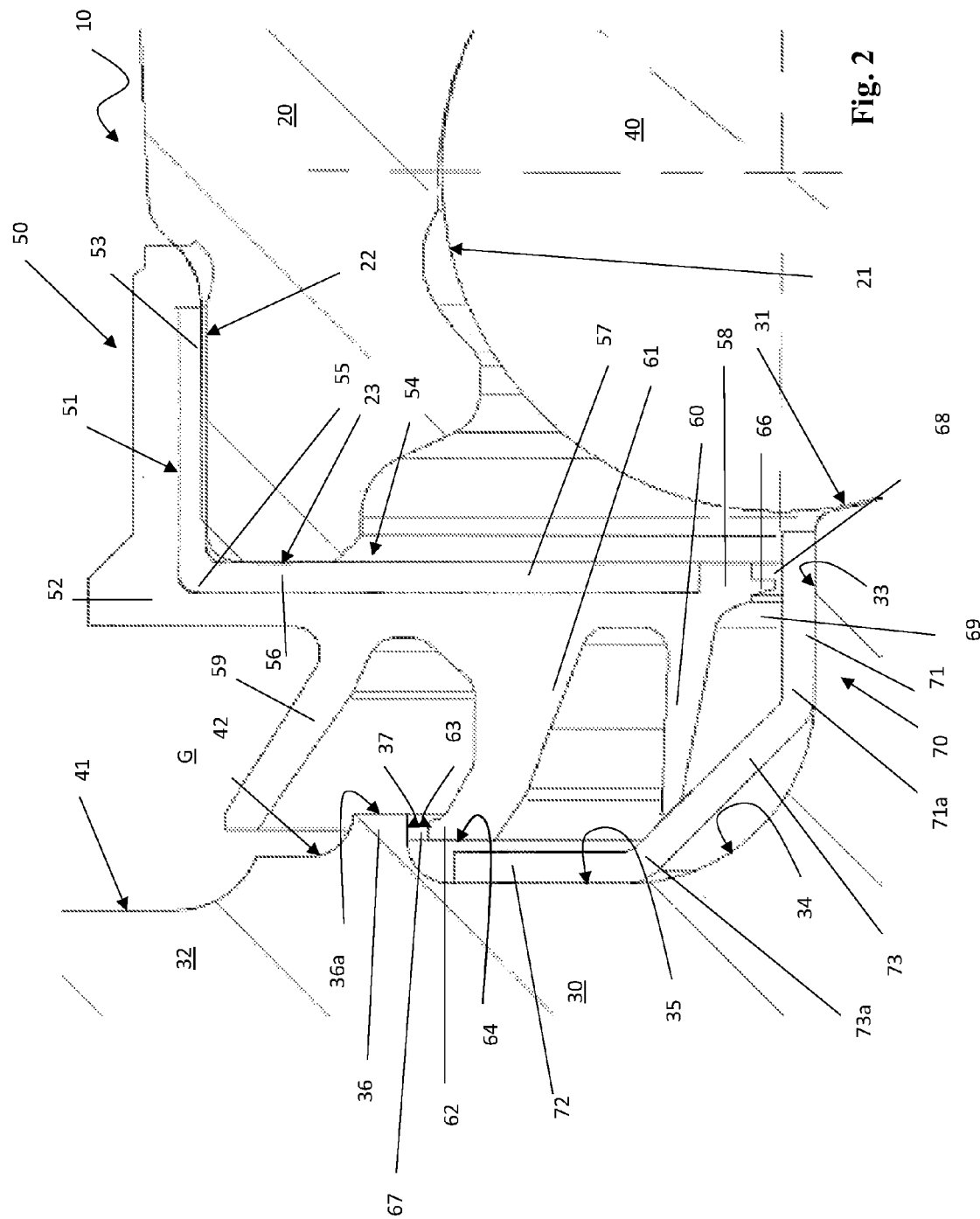
FIG. 2 is a detail in axisymmetric section and enlarged scale of the sealing device of the hub-bearing unit of FIG. 1.

Referring now to the figures, a hub-bearing unit, indicated as a whole by 10, it is intended to rotatably mount a wheel (not shown) to a vehicle.

The unit 10 has a central axis of rotation X and includes a radially outer ring 20, a radially inner ring 30, and a plurality of rolling bodies 40, in this example balls, which are interposed between the outer ring 20 and the inner ring 30. The outer ring 20 is a stationary ring, fixed to the suspension of the vehicle, and has at least one radially outer raceway 21 formed on a radially inner surface of the ring itself. Throughout the present description and in the claims, terms and expressions indicating positions and directions, for example "radial" and "axial", are understood as referring to the axis of rotation X of the hub-bearing unit 10. Expressions such as "axially inner" and "axially outer" refer instead to the mounted state on the vehicle and in this case, they are referred, respectively, to a wheel side and to a side opposite to the wheel side.

The inner ring 30 is a rotatable ring, which presents a rolling surface 31 disposed in a radially inner position coaxially with respect to the inner raceway 21. The inner ring 30 forms a flange 32 extending radially outwardly from the side outboard, that is, from the axially outer side of the vehicle. The flange 32 is provided with connecting means 11 to allow the mounting of the vehicle wheel. Typically, connection means may comprise a plurality of threaded holes 11 formed axially through the flange to accommodate respective mounting screws of the wheel. The hub-bearing unit, shown only partially in the figures, typically includes two rows of rolling bodies 40 and 40*a*, according to a configuration known per se, which need not be described here in greater detail.

Between the flange 32 and the outer ring 20 of the bearing is identified a gap G that is necessary to protect at best, to prevent contaminants such as water, dust, mud, to penetrate into the inner parts of the bearing and deteriorate the surfaces concerned by rolling of the rolling bodies 40, 40*a*. For this purpose, a sealing device 50 is provided, which is mounted on the outer ring of the bearing 10 and has a plurality of sealing lips which extend towards the rotatable inner ring 30, as described later.

The flanged and rotatable inner ring 30 has, as already mentioned, the raceway 31 and, adjacent to this, a cylindrical axial surface 33, facing in a radially outer direction. The cylindrical surface 33 is radiused to a portion of the toroidal surface 34, located at the base of the flange 32 from the axially inner side. The toroidal surface 34 is radiused to a portion of a radial surface 35.

The flange 32 forms an annular protrusion 36 that projects in the axially inner direction and which has a radially inner surface 37, cylindrical or frustoconical, facing towards the rotation axis X, in the radially inner direction. The cylindrical or frusto-conical surface 37 is radiused to the radial surface 35.

The annular protrusion 36 has an end surface 36*a*, substantially radial or transverse with respect to the axis of rotation X, facing towards the axially inner parts of the bearing. With 41 is indicated a portion of the radial surface formed by the axially inner side of the flange 32 in a radially external position to the annular protrusion 36; the latter is joined to the radial surface 41 through a toroidal surface 42.

The sealing device 50 comprises: a first metal insert 51 of annular shape which is fixed on an end portion of the outer ring 20 facing towards the flange 32; an annular gasket 52 of elastomeric material, integral with the metal insert 51, for example by means of vulcanization, and illustrated here in an undeformed condition; a second metal insert 70, curved shaped, which will be better described hereinafter, and secured by radial interference on the cylindrical axial surface 33 of the inner ring 30.

The first metallic insert 51 has a substantially L-shape in the axial section, preferably obtained by means of folding and shearing of a steel sheet, and comprises a cylindrical portion 53, which is press-fit by radial interference around a surface 22 of the cylindrical end portion of the outer ring 20, and a substantially radial portion 54, disc shaped, which extends in a radially inner direction from an end portion 55 of the cylindrical portion 53.

A radially outermost part 56 of the disc shaped or radial portion 54 is disposed in abutment against a radial surface 23 of the outer ring 20; a second part, radially innermost 57, protrudes in a radially inner direction beyond the outer ring 20, extending towards the rotatable inner ring 30 of the hub-bearing unit.

The second metal insert 70 has an overall shape in axial section shaped in three different portions, preferably obtained by means of folding and shearing of a of steel sheet, and comprises a cylindrical portion 71, which is press-fit by radial interference around the cylindrical surface 33 of the inner ring 30, a substantially frusto-conical portion 73 which extends in the direction axially and radially outward from an end portion 71*a* of the cylindrical portion 71, and a substantially radial portion 72, disc-shaped, that is extending in a radially outer direction starting from an end portion 73*a* of the frustoconical portion 73. The axial positioning of the insert 70, during the press-fit operation, and in particular of its cylindrical portion 71 is secured by the abutment of the substantially radial portion 72 against the radial surface 35 of the flange portion 32.

The gasket 52 has a first axial contacting lip 60 which extends axially from a radially inner end portion 58 of the seal and slidingly contacts the substantially frusto-conical portion 73 of the metal insert 70. A further radial lip 66, not contacting, extends from the radially inner end towards the cylindrical portion 71 of the second metal insert 70.

A second axial lip 61, not contacting, extends towards the flange 32 and has a free end portion 62 which realizes a labyrinth seal, without contact, with the flange 32. The free end portion 62 of the lip 61 has a surface, preferably cylindrical or slightly frusto-conical 63, axially extended and coaxially facing the inside surface 37 of the protrusion 36, so as to cooperate with the surface to create a labyrinth seal particularly effective. Moreover, a further labyrinth seal is achieved thanks to the fact that the free end portion 62 of the axial non-contacting lip 61 has a surface 64, axially outer, facing the substantially radial portion 72 of the second insert 70.

The coaxially elongated shape of the facing surfaces 37 and 63 is advantageous in that it determines between these two surfaces a meatus 67 cylindrical or frustoconical that enhances the effect of a labyrinth seal. It is thus realized a sinuous path that makes particularly difficult the entry of contaminants (water, dust, mud) over the lip 61.

When the inner ring 30 rotates with respect to the outer ring 20, the toroidal shape of the surface 42 facilitates the expulsion of water even before it reaches the area of the lip 61. The contacting lip 60 achieves an additional barrier to contaminants. In addition, the radial non-contacting lip 66 defines two chambers 68 and 69, of which the first chamber 68 is inside the bearing and the second chamber 69 is bounded by the two lips 60, 61 and the surfaces 34, 35 of the flange 32. The two chambers 68, 69 can be filled with lubricating grease which can be of different type; the radial lip 66 prevents contact and mixing between the two different types of grease.

The presented solution, in addition to ensure an excellent barrier to the introduction of contaminants into the bearing, has a further advantage in terms of manufacturing process of the whole hub-bearing unit. In fact, the surfaces of the ring 30 and the flange 32 are not affected by the sliding of the lips of the sealing device and therefore does not require a particularly high level of mechanical finishing to minimize the surface roughness. Thanks to the presence of a single contacting or sliding lip, the friction due to sliding is reduced to a minimum and only involves the second metal insert 70.

The invention is not limited to the particular geometry of the sealing device as illustrated in the figures. For example, the elastomeric seal 52 may form an additional non-contacting lip 59 which extends towards the flange 32 of the rotatable inner ring 30.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A hub-bearing unit for rotatably mounting a wheel to a vehicle, the unit having an axis of rotation and comprising:
   a radially outer ring, stationary;
   a radially inner ring, which is rotatable about the axis of rotation and provides a flange extending in a radially outer direction for mounting a wheel;
   a plurality of rolling bodies interposed between the outer and inner rings; and
   a sealing device comprising a first metal insert, having an annular shape, steadily fixed at an end portion of the outer ring facing the flange, an annular gasket, having a plurality of elastomeric sealing lips and steadily fixed to the first metal insert, and a second metal insert, steadily fixed on an axial cylindrical surface of the inner ring,
   wherein the gasket presents a first axial contacting lip, which slidingly contacts a substantially frustoconical portion of the second metal insert,
   wherein the axial positioning of the second metal insert is ensured by the contact of a substantially radial portion against a radial surface of the flange,
   wherein the flange forms an annular protrusion, which projects in an axially internal direction and presents a radially internal surface, the radially internal surface being one of cylindrical or frustoconical shaped, exposed towards the rotation axis,
   wherein the axial cylindrical surface of the inner ring is adjacent to a racing race, is exposed towards a radially external direction and is radiused to a toroidal surface portion, located at the flange base from the axially internal side and the toroidal surface portion is radiused to a radial surface portion,
   wherein the radially internal surface is radiused to the radial surface portion.

2. The hub-bearing unit according to claim 1, the second metal insert further comprises a cylindrical portion,
   wherein the cylindrical portion is tight fit with radial interference around the cylindrical surface of the inner ring,
   wherein the substantially frustoconical portion extends in an axially and radially external direction from an end portion of the cylindrical portion,
   wherein the substantially radial portion, is disc shaped and extends in a radially external direction from an end portion of the frustoconical portion.

3. The hub-bearing unit according to claim 1, at least one of the elastomeric sealing lips of the sealing device is an axial non-contacting lip,
   wherein the axial non-contacting lip axially extends towards the flange and has a free end portion,
   wherein the free end portion performs a labyrinth seal, without contact, with the radially internal surface of the annular protrusion.

4. A hub-bearing unit according to claim 3, the free end portion of the axial non-contacting lip has an axially external surface,
   wherein the axially external surface is exposed to the substantially radial portion of the second metal insert.

5. The hub-bearing unit according to claim 1, a free end portion of a non-contacting axial lip has one of a cylindrical surface or a frustoconical surface,
   wherein the one of the cylindrical or the frustoconical surface axially extends and is coaxially exposed inside the radially inner surface of the protrusion, so as to form with the frustoconical surface, one of a cylindrical gap or a frustoconical gap, thus obtaining a labyrinth seal.

6. A hub-bearing unit according to claim 5, the annular protrusion projects in an axially internal direction beyond the one of the cylindrical surface or the frustoconical surface of the non-contacting lip.

7. A hub-bearing unit according to claim 1, the flange presents a radial surface portion,
   wherein the radial surface portion is formed on an axially internal side of the flange, in a radially external position with respect to the annular protrusion position and in that the annular protrusion is radiused to the radial surface by a toroidal surface.

* * * * *